April 25, 1967 C. L. SMALL 3,315,977
VEHICLE AXLE SUSPENSION
Filed Sept. 17, 1964 2 Sheets-Sheet 1
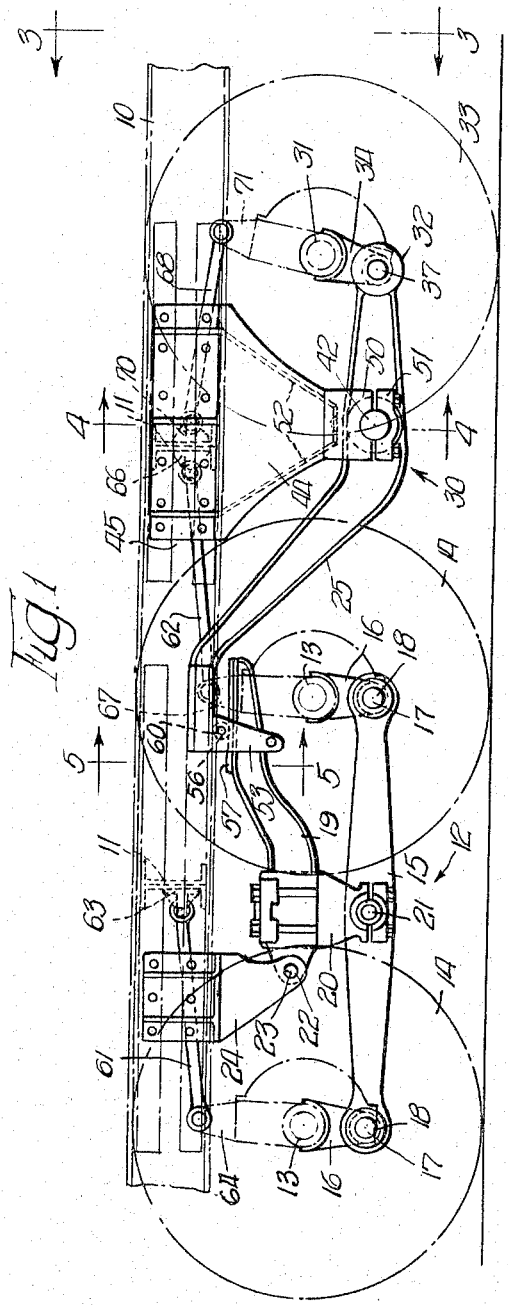
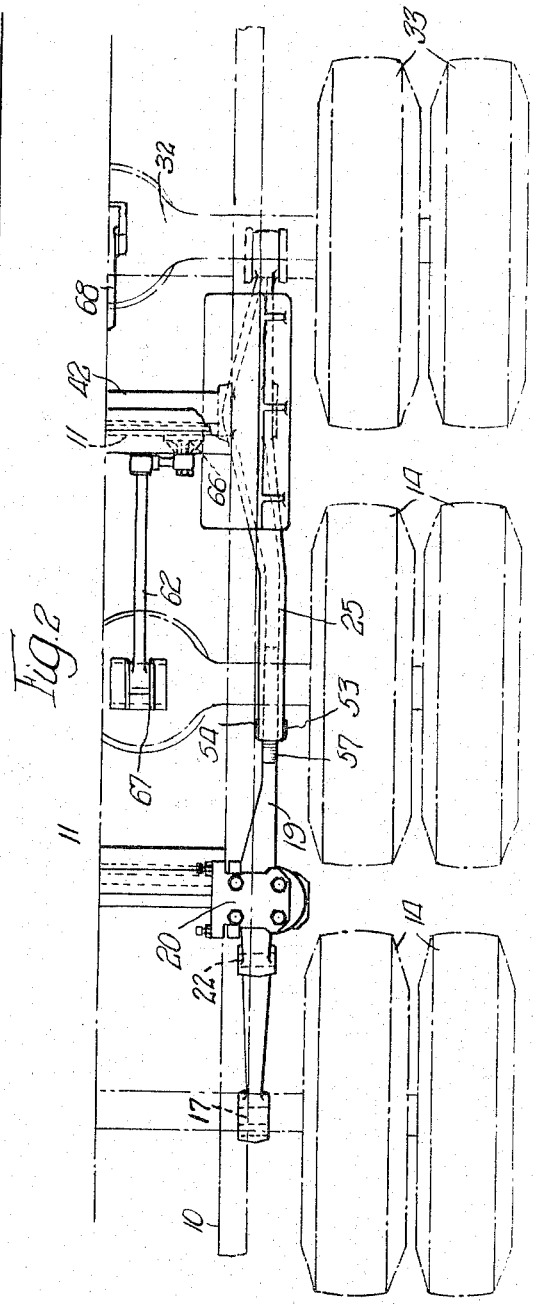
INVENTOR.
Charles L. Small,
BY
Treist, Lockwood, Greenawalt + Dewey
Attys April 25, 1967  C. L. SMALL  3,315,977
VEHICLE AXLE SUSPENSION
Filed Sept. 17, 1964  2 Sheets-Sheet 2
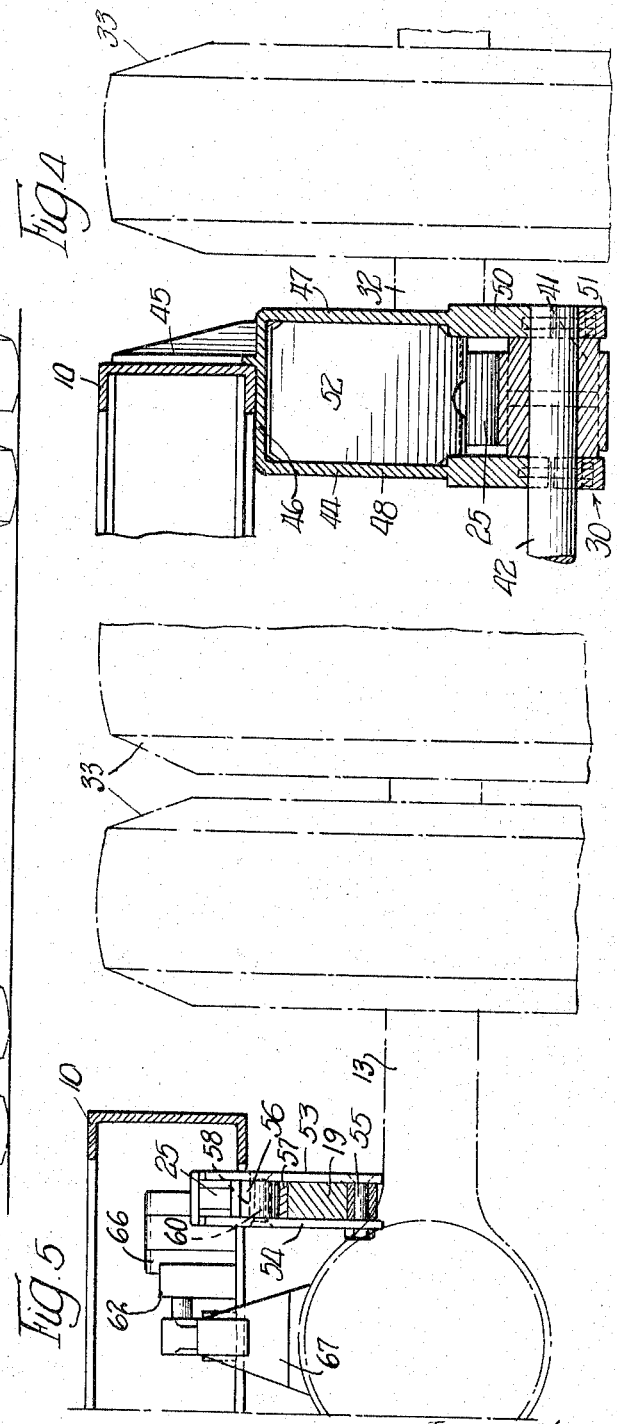
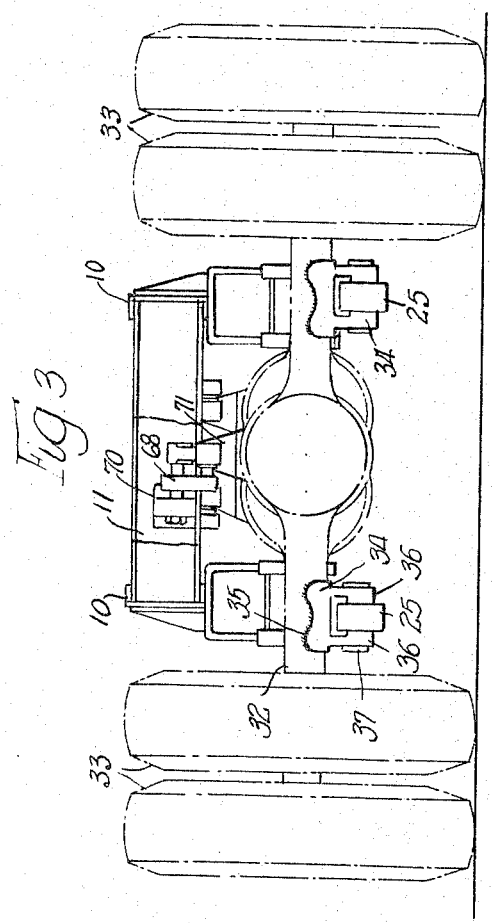
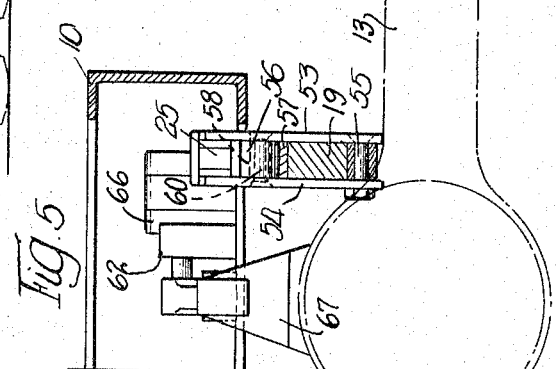
Inventor
Charles L. Small,
By Trust, Lockwood, Greenawalt & Dewey
Attys United States Patent Office  3,315,977
Patented Apr. 25, 1967

3,315,977
VEHICLE AXLE SUSPENSION
Charles L. Small, Chicago, Ill., assignor to Hendrickson Manufacturing Co., Lyons, Ill., a corporation of Illinois
Filed Sept. 17, 1964, Ser. No. 397,110
4 Claims. (Cl. 280—104.5)

This invention relates, generally, to rear axle units for heavy duty vehicles such as highway trucks and trailers and is more particularly concerned with improvements in a rear axle suspension which includes a third axle unit for heavy duty vehicles.

Many vehicles are now in use in the construction business for transporting heavy machinery, such as cranes and earth movers, which vehicles usually employ on their rear ends suspension units of the type having tandem axles interconnected on opposite sides by load distributing or equalizing beams whereby the load will be evenly distributed on each wheel and axle while allowing each wheel to individually accommodate itself to irregularities in the road. It is sometimes desirable to provide a vehicle of this type which is capable of transporting an unusually heavy load, that is a load of such magnitude that the bearing pressure exerted by each wheel, in a normal suspension arrangement, would exceed the permissible limit under the statutes in force in most states for limiting the bearing load which may be carried by each wheel of a truck or trailer. Also it may be desirable to provide for transporting a heavy load over a road or highway which is in poor condition and wherein greater than normal distribution of the load on additional axles and wheels would be highly desirable. It is a general object of the invention therefore to provide a rear axle suspension for heavy duty vehicles, such as a truck or trailer, which includes a third axle adapted to support a portion of the load, thereby spreading out or distributing the load so as to decrease the load carried by any one axle and satisfy the requirements of the statutes which prescribe maximum permissible axle loads.

It is a more specific object of the invention to provide a springless axle suspension which includes a third axle unit, with the latter permanently mounted on the vehicle frame and being adapted to be used with either driven or non-driven axles, and having third axle side beams which are disposed partly outside the main frame so as to allow for greater vertical movement.

A further object of the invention is to provide an axle suspension system which has a simple and rugged construction, which is relatively inexpensive to manufacture, which can be used or readily adapted for use with most trucks and trailers, and which serves to distribute the load so that the bearing pressure exerted by each wheel is held within a predetermined limit.

These and other objects and advantages of the invention will be apparent from a consideration of the suspension system which is shown by way of illustration in the accompanying drawings wherein:

FIGURE 1 is a side elevational view of the rear portion of a vehicle having a rear axle suspension constituting one embodiment of the present invention which is attached thereto so as to provide one additional axle onto which the load may be distributed;

FIGURE 2 is a fragmentary top plan view, with portions omitted or in phantom line, the view showing one side of the embodiment of the invention which is shown in FIGURE 1;

FIGURE 3 is a rear end elevational view of the suspension, the view being taken on the line 3—3 of FIGURE 1, and portions being broken away;

FIGURE 4 is an enlarged vertical cross section taken on the line 4—4 of FIGURE 1; and FIGURE 5 is an enlarged vertical cross section taken on the line 5—5 of FIGURE 1.

Referring to FIGURES 1 and 2 of the drawings there is illustrated the rear portion of the vehicle frame comprising laterally spaced parallel side beams 10 connected by suitable cross frame channels 11 beneath which there is located a tandem rear axle unit 12 which normally supports the rear end of the vehicle. The construction on one side of the vehicle is identical with that on the other except that one is right handed and the other is left handed, therefore it will suffice to described and show only one side of the tandem wheel support, it being understood that the other side corresponds. A pair of tandem axle housings 13—13 are indicated which extend transversely underneath the frame and which have ground engaging wheels 14—14 mounted on opposite ends thereof. The wheels 14—14 may be of the dual type. Interiorly of each of the sets of wheels 14—14, an equalizing beam 15, generally referred to as a "walking beam" is provided which extends between adjacent ends of the axle housings 13—13 and is pivotally supported or connected thereto by means of brackets or hangers 16—16. The lower ends of bracket 16—16 are bifurcated so as to fit over eyes 17 formed on the opposite ends of each walking beam 15. A pin 18 is inserted through each eye 17 and registering holes in the bottom ends of the brackets 16—16.

The weight of the vehicle is supported on the axles 13—13 and in turn on the wheels 14—14 by a solid beam-like assembly 19, one of which is located on each side of the vehicle as shown in FIGURE 2. Each of the assemblies 19 is a solid casting of beam-like form which is mounted adjacent its forward end on the top of a saddle 20. The saddle 20 straddles the middle of the adjacent walking beam 15 and is pivotally connected thereto by means of cross pin 21. Each of the assemblies 19 is pivotally connected at its forward end, which is adjacent the saddle 20, to the underside of the adjacent frame member 10 by means of a pin 22 which extends through an eye 23 formed on the front end of the assembly 19 and a registering hole in a bracket fixture 24 which is secured to the underside of the frame member 10 and depends therefrom. The assembly 19 has a pivotal and sliding connection with the forward end of a supporting beam 25 forming a part of a third axle assembly 30 which is permanently mounted on the frame members 10 at the rear of the vehicle.

The third axle unit 30 comprises an axle 31 which extends through an axle housing 32 and projects at opposite ends thereof so that supporting wheels 33—33 may be attached thereto. As in the case of the wheels 14—14 the wheels 33—33 may be either single type wheels or dual type wheels. The axle housing 32 is connected at its opposite ends with the rear ends of the load distributing or supporting beams 25 by means of hanger brackets 34. The hanger brackets 34 (FIGURE 3) are similar to the hanger brackets 16 and each comprises a base plate portion 35 which is curved so as to conform to the contour of the axle housing 32 and is welded thereto. A pair of arms 36—36 project downwardly from opposite sides of each of the base plates 35 so as to support between the ends thereof a bearing pin 37 which is received in an eye in the rear end of the beam 25 so as to form a bearing support for the load distributing beam 25. It is understood that the brackets 34—34 are aligned on the axle housing 32 so that the pins 37 will be in substantial coaxial alginment.

The load transmitting beams 25 are shaped as shown in FIGURE 1 in side elevation and have a cross section as indicated in FIGURES 4 and 5. Each of the load transmitting beams 25 is provided intermediate its ends with a transversely extending sleeve bearing 41 which extends through and which is welded to the reinforcing webs as shown in FIGURE 4. The sleeve bearings 41 serve as journals for the opposite ends of transverse support shaft 42. The sleeve bearings 41 permit the beams 25 to turn independently on opposite ends of the shaft 42. The shaft 42 is supported at its opposite ends by means of a pair of brackets or saddles 44—44.

The brackets 44—44 (FIGURE 4) have inverted U-shape with an upstanding top plate portion 45 which is bolted or otherwise secured to the outside face of the frame side member 10 and with a web portion 46 which extends beneath the bottom face of the frame member 10. Depending side plates 47, 48 terminate at the upper clamp member 50 which has an associated bottom clamp member 51 for clamping to the shaft 42. The side plates 47, 48 are reinforced by web forming cross plates 52. Each load distributing beam 25 has its forward end secured to a pair of depending, laterally spaced parallel plates 53, 54 which form with the end portion of the beam 25 an inverted U-shaped bracket. A rebound bolt 55 connects the lower ends of the plates 53, 54 and a bearing roller 56 is mounted between the plates 53, 54 so as to ride on the horizontal top surface of bearing plate 57 on the end of the assembly 19. The roller 56 has a bushing 58 and is mounted on a cross pin 60.

The housings for the shafts 13—13 are held against turning movement by torque rods 61 and 62. At one end the torque rod 61 has a universal connection with a suitable securing bracket 63 on a cross frame member 11 and at the other end it has a pivotal connection with a bracket 64 mounted on the universal housing which forms part of the shaft housing 13. The torque rod 62 is connected at one end in a similar manner to a frame cross member 11 by a bracket 66 and at the other end to the axle housing by a bracket 67. The axle housing 32 for the third axle unit 30 is also braced against rotational movement by a torque rod 68 which is connected in the same manner as torque rods 61 and 62 to a cross frame member 11 by a suitable bracket 70 and to the axle housing 32 by a bracket 71.

The third axle unit 30 is permanently mounted directly on the vehicle frame by means of the solid brackets 44—44 which support the cross shaft 42, with the latter pivotally supporting the beams 25 at points spaced forwardly of the connection thereof with the axle housing 32 so that the load is distributed between the normal suspension unit and the third axle unit. The third axle beams 25 are disposed partially outside the main frame of the vehicle which allows greater movement.

The third axle unit is illustrated as embodied in a vehicle having a normal tandem axle suspension. It may also be incorporated in a vehicle having a single axle unit and it may be employed with either driven or non-driven axles.

While particular materials and specific details of construction are referred to in describing the form of the invention illustrated in the drawings, it will be understood that other materials and equivalent structural details may by resorted to within the scope of the appended claims.

I claim:

1. A vehicle rear suspension structure adapted for heavily loaded vehicles having a frame with parallel side beams, said suspension structure comprising a tandem wheel suspension unit and a third axle suspension unit both disposed beneath the rear end portion of the permanent frame of the vehicle and in part outside of said side beams, said tandem wheel unit including a pair of axles, a walking beam on each side of the vehicle, means for pivotally attaching the opposite ends of each said walking beam to the adjacent ends of said axles so that the walking beam is disposed below the axles, an elongate rigid casting forming a solid beam member disposed immediately above each said walking beam, a saddle member pivotally connecting the midpoint of said walking beam with said solid beam member at a point intermediate the ends of said solid beam member, an attaching bracket depending from the adjacent vehicle frame side beam and pivotally connected to the forward end of said solid beam member, said solid beam member having means at its opposite end forming a sliding pivotal connection with said third axle unit, said third axle unit including an axle disposed parallel with said tandem axles, an elongate load distributing beam on each side of said vehicle frame which extends beneath and is disposed in part outside of the vehicle side beam, means pivotally connecting the rear end of each said load distributing beam beneath the adjacent end of the axle of said third axle unit, a transverse shaft having its opposite ends journaled in said load distributing beams intermediate the ends thereof, and a bracket depending from each vehicle frame side beam, said brackets supporting opposite ends of said transverse shaft, and said sliding pivotal connection between the solid beam member of said tandem axle unit and said third axle unit comprising a horizontally disposed bearing plate on the top of the rearward end of the solid beam member and a roller bearing member on the forward end of the adjacent load distributing beam which is positioned to ride on said bearing plate.

2. A vehicle rear suspension structure adapted for mounting on vehicles having a frame with parallel side beams, said suspension structure comprising a tandem wheel unit and a third axle unit both disposed beneath the rear end portion of the frame of the vehicle, said tandem wheel unit having a pair of axles inclosed in axle housings, a walking beam on each side of the vehicle, means including hanger brackets for pivotally attaching the opposite ends of each said walking beam to the bottom of adjacent ends of said axle housings, an elongate rigid casting forming a solid beam member spaced above said walking beam, a saddle forming member pivotally connected to the midpoint of said walking beam and secured to said solid beam member at a point adjacent the forward end of said solid beam member, an attaching bracket depending from the adjacent vehicle side beam and pivotally connected to the forward end of said solid beam member, said solid beam member extending toward the rear of the vehicle frame above said walking beam and having an upwardly facing bearing surface adjacent the rear end thereof adapted for a sliding connection with said third axle unit, said third axle unit having an axle disposed parallel with said tandem axles and a housing for said axle, elongate load distributing beams on each side of said vehicle frame which extend beneath and are disposed in part outside of the vehicle side beams, means including hanger brackets depending from the rear end of each said load distributing beam and pivotally connecting said load distributing beam beneath the adjacent end of the axle housing of said third axle unit, said load distributing beams having aligned journal bearings, a transverse shaft having its opposite ends journaled in said journal bearings, supporting brackets depending from the vehicle frame side beams and receiving opposite ends of said transverse shaft and said load distributing beams having means at the forward ends thereof positioned to ride on the bearing surfaces on the rear ends of said solid beam members and co-operating therewith to form said sliding pivotal connection between each said solid beam member and said third axle unit.

3. In a suspension structure for the rear end of a vehicle, a third axle unit for attachment of the permanent frame of the vehicle, said third axle unit comprising an axle, support wheels on opposite ends of said axle, an axle housing fitting over said axle, a pair of elongate load transmitting beams extending along opposite sides of said unit in front to rear direction, said load transmitting beams being characterized by a rear portion disposed generally horizontally and a forward portion extending at an upwardly inclined angle to the rear portion, means pivotally connecting the rear end of each said load transmitting beam to the bottom of the adjacent end of said axle housing, journal bearings mounted on said load transmitting beams intermediate the opposite ends thereof which are aligned transversely of the vehicle, a transverse shaft having its opposite ends journaled in said bearings, bracket members depending from the permanent frame of the vehicle and supporting the opposite ends of said shaft, a tandem wheel suspension unit disposed beneath said vehicle frame, which tandem unit comprises a pair of axles, a walking beam on each side of said vehicle, means pivotally connecting the opposite ends of said walking beams to the adjacent ends of said tandem axles, a rigid casting constituting a solid beam forming member extending above each walking beam, a saddle forming member depending from a point intermediate the ends of said solid beam forming member and pivotally connected to the midpoint of the adjacent walking beam, an attaching bracket depending from said vehicle frame and pivotally connected to the forward end of said solid beam-like member, the forward end of said load transmitting beam overlying the rear end of said solid beam forming member and means forming a sliding pivotal connection between the rear end of said solid beam forming member and the forward end of said load transmitting beam.

4. In a suspension structure for the rear end of a vehicle, a third axle unit for attachment to the frame of the vehicle, said third axle unit comprising an axle, support wheels on opposite ends of said axle, an axle housing fitting over said axle, a pair of elongate rigid load transmitting beams extending along opposite sides of said unit in front to rear direction, said load transmitting beams having a rear end portion disposed generally horizontally and a forward portion at a substantially higher level connected by an intermediate portion extending at an upwardly inclined angle to the rear portion, means for pivotally attaching the rear end of each said load transmitting beam to the bottom of the adjacent end of said axle housing, said load transmitting beams having bearing members intermediate the opposite ends thereof which are aligned transversely of the vehicle, a transverse shaft having its opposite ends journaled in said bearing members, brackets depending from the permanent frame of the vehicle and supporting the opposite ends of said transverse shaft, a wheel suspension unit disposed beneath said vehicle frame, which suspension unit comprises a pair of axles, a walking beam on each side of said vehicle, means pivotally connecting the opposite ends of said walking beams to the adjacent ends of said pair of axles, a rigid casting constituting a beam forming member extending above each walking beam, a saddle forming member depending from a point intermediate the ends of said rigid beam forming member and pivotally connected to the midpoint of the adjacent walking beam, an attaching bracket depending from said vehicle frame and pivotally connected to the forward end of said rigid beam forming member, the forward end of said load transmitting beam having a guideway forming portion for the rear end of said rigid beam forming member which receives the rear end of said rigid beam forming member in sliding relation therein.

References Cited by the Examiner
UNITED STATES PATENTS

| | | | |
|---|---|---|---|
| 274,098 | 3/1883 | Tarbell | 267—56 |
| 1,928,860 | 10/1933 | Marcum | 267—56 |
| 2,665,142 | 1/1954 | Talbert. | |
| 2,760,784 | 8/1956 | Talbert | 280—104.5 |

FOREIGN PATENTS

| | | |
|---|---|---|
| 323,854 | 1/1935 | Italy. |

MILTON BUCHLER, *Primary Examiner.*

BENJAMIN HERSH, *Examiner.*

P. GOODMAN, *Assistant Examiner.*